United States Patent
Long et al.

(10) Patent No.: US 12,474,604 B2
(45) Date of Patent: Nov. 18, 2025

(54) LARGE AREA INFRARED SENSOR FILM

(71) Applicant: 3M INNOVATIVE PROPERTIES COMPANY, St. Paul, MN (US)

(72) Inventors: Shine Long, Guangzhou (CN); Xue Mao, Beijing (CN); Jingfei Chen, Shanghai (CN); Bharat R. Acharya, Woodbury, MN (US); Huijie Xie, Beijing (CN); Zhiping Liu, Guangzhou (CN); Zhe Hu, Suzhou (CN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 354 days.

(21) Appl. No.: 18/037,412

(22) PCT Filed: Dec. 2, 2021

(86) PCT No.: PCT/IB2021/061256
§ 371 (c)(1),
(2) Date: May 17, 2023

(87) PCT Pub. No.: WO2022/123406
PCT Pub. Date: Jun. 16, 2022

(65) Prior Publication Data
US 2023/0418079 A1 Dec. 28, 2023

Related U.S. Application Data

(60) Provisional application No. 63/124,123, filed on Dec. 11, 2020.

(51) Int. Cl.
*G02F 1/1333* (2006.01)
*G02B 5/20* (2006.01)
(Continued)

(52) U.S. Cl.
CPC ......... *G02F 1/13338* (2013.01); *G02B 5/201* (2013.01); *G02B 5/208* (2013.01);
(Continued)

(58) Field of Classification Search
CPC ........... G02F 1/13338; G02F 1/133524; G02B 5/201; G02B 5/208; G02B 5/26;
(Continued)

(56) References Cited

U.S. PATENT DOCUMENTS

2013/0149488 A1 6/2013 Chandrasekaran
2018/0120149 A1* 5/2018 Chung .................... G01S 17/04
(Continued)

FOREIGN PATENT DOCUMENTS

CN 103076099 A 5/2013
CN 106847988 B 5/2018

OTHER PUBLICATIONS

Brahim, "Visible and Near-Infrared Photo-Detector Combining Polysilicon TFT and PBS Quantum Dots", 2017, 1 page (Abstract only).
(Continued)

*Primary Examiner* — Charles S Chang
(74) *Attorney, Agent, or Firm* — Jonathan L. Tolstedt

(57) ABSTRACT

A display system for imaging a user body portion includes a display panel, an optical sensor disposed on the display panel and configured to detect light reflected by the user body portion, and an optical stack disposed between the display panel and the optical sensor. The optical stack includes a first optical reflector and a light collimating film. The light collimating film includes a plurality of substantially coplanar alternating first and second regions. For an incident light, a visible wavelength range, and an infrared wavelength range, and for each of a first incident angle of less than about 5 degrees and a second incident angle of
(Continued)

between about 40 degrees and about 70 degrees, the plurality of polymeric layers has an average optical reflectance of greater than about 70% in the visible wavelength range and an optical transmittance of greater than about 30% in the infrared wavelength range.

17 Claims, 5 Drawing Sheets

(51) Int. Cl.
*G02B 5/26* (2006.01)
*G02B 27/30* (2006.01)
*G06V 40/13* (2022.01)
*G06V 40/145* (2022.01)
*G06V 40/16* (2022.01)
*H10K 59/65* (2023.01)

(52) U.S. Cl.
CPC .............. *G02B 5/26* (2013.01); *G02B 27/30* (2013.01); *G06V 40/1318* (2022.01); *G06V 40/145* (2022.01); *G06V 40/166* (2022.01); *H10K 59/65* (2023.02)

(58) Field of Classification Search
CPC  G02B 27/30; G02B 2207/123; G02B 5/0841; G06V 40/1318; G06V 40/145; G06V 40/166; H10K 59/65; G06F 3/0421
See application file for complete search history.

(56) References Cited

U.S. PATENT DOCUMENTS

2020/0038768 A1    2/2020   Binder
2020/0387686 A1   12/2020   Jhang et al.

OTHER PUBLICATIONS

International Search report for PCT International Application No. PCT/IB2021/061256, mailed on Mar. 4, 2022, 6 pages.

Liu, "Silicon Thin Film Transistor Based on PBS Nano-Particles: An Efficient Phototransistor for the Detection of Infrared Light", HAL Open Science, Jan. 2020, pp. 1-155.

\* cited by examiner

LARGE AREA INFRARED SENSOR FILM

CROSS REFERENCE TO RELATED APPLICATIONS

This application is a national stage filing under 35 U.S.C. 371 of PCT/IB2021/061256, filed Dec. 2, 2021, which claims the benefit of U.S. Provisional Application No. 63/124,123, filed Dec. 11, 2020, the disclosures of which are incorporated by reference in their entireties herein.

SUMMARY

In some aspects of the present description, a display system for imaging a user body portion placed at or proximate to the display system is provided, the display system including a display panel configured to generate an image for viewing by the user, an optical sensor, and an optical stack disposed between the display panel and the optical sensor. The optical sensor is disposed on the display panel opposite the user body portion and is configured to detect light having at least a first wavelength and reflected by the user body portion. Optically active regions of the optical sensor and the display panel are substantially co-extensive with each other in length and width.

The optical stack includes a first optical reflector facing the display panel and including a plurality of first polymeric layers numbering at least 30 in total, each of the first polymeric layers having an average thickness of less than about 500 nm, and a light collimating film facing the optical sensor and having a plurality of substantially coplanar alternating first and second regions. Each of the first regions has a lateral maximum dimension W1 and a height H1, where H1/W1 is greater than or equal to 2. For an incident light, a visible wavelength range extending from about 420 nm to about 680 nm, and an infrared wavelength range extending from about 750 to about 1500 nm and including the at least the first wavelength: for each of a first incident angle of less than about 5 degrees and a second incident angle of between about 40 degrees and about 70 degrees, the plurality of polymeric layers has an average optical reflectance of greater than about 70% in the visible wavelength range and an optical transmittance of greater than about 30% for the at least the first wavelength in the infrared wavelength range. For the first incident angle and for each of the visible and infrared wavelength ranges, the first regions of the light collimating film have an average optical transmittance of greater than about 50%, and the second regions of the light collimating film have an average optical absorbance of greater than about 30%. For the second incident angle and for each of the visible and infrared wavelength ranges, the optical stack has an optical transmittance of less than about 10%.

In some aspects of the present description, an optical stack for use in a display system for imaging a user body portion placed at or proximate to the display system is provided, the optical stack including a light collimating film disposed between first and second optical reflectors, each of the second optical reflector and the light collimating film comprising a plurality of laterally spaced apart first regions defining one or more second regions therebetween. For an incident light, for each of at least one visible wavelength in a visible wavelength range extending from about 420 nm to about 680 nm and at least one infrared wavelength in an infrared wavelength range extending from about 750 nm to about 1500 nm, and for a first incident angle of less than about 5 degrees: the first optical reflector has an optical reflectance of greater than about 70% for the at least one visible wavelength and an optical transmittance of greater than about 30% for the at least one infrared wavelength, and each of the first regions of the second optical reflector and the light collimating film has an optical transmittance of greater than about 50%, each of the one or more second regions of the second optical reflector has an optical reflectance of greater than about 30%, and each of the one or more second regions of the light collimating film has an average optical absorbance of greater than about 30%.

DETAILED DESCRIPTION

Figure 1A:
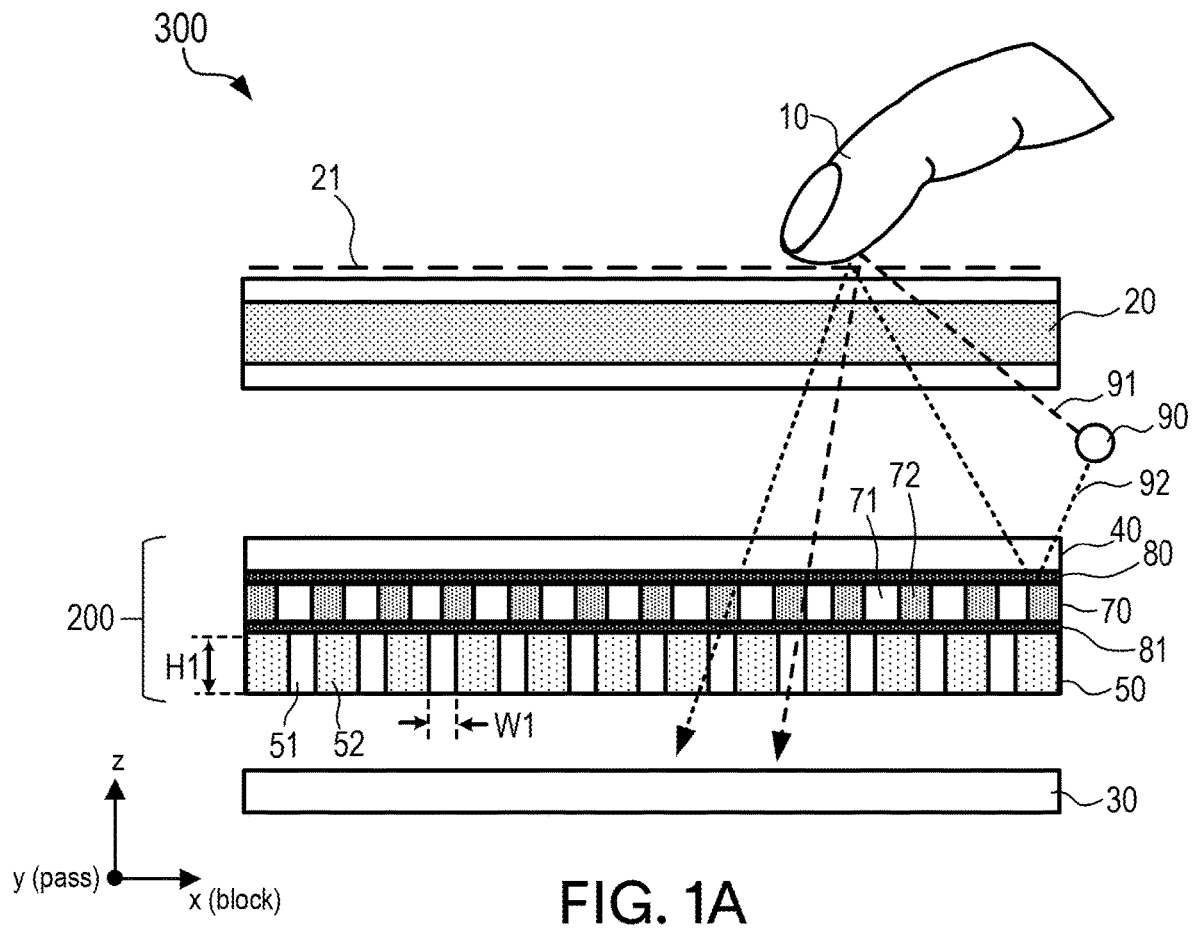
FIGS. 1A and 1B provide side views of a display system for imaging a user body portion placed at or proximate to the display system, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some aspects of the present description, a display system for imaging a user body portion placed at or proximate to the display system includes a display panel configured to generate an image for viewing by the user, an optical sensor, and an optical stack disposed between the display panel and the optical sensor. In some embodiments, the user body portion may include, but not be limited to, one or more of a finger of the user, a palm of the user, a vein of the user, a face of the user, and a vein pattern of the user.

In some embodiments, the optical sensor may be disposed on the display panel opposite the user body portion and may be configured to detect light having at least a first wavelength (e.g., an infrared wavelength) and reflected by the user body portion. In some embodiments, optically active regions of the optical sensor and the display panel may be substantially co-extensive with each other in length and width.

In some embodiments, the optical stack may include a first optical reflector facing the display panel and a light collimating film. In some embodiments, the first optical reflector may include a plurality of first polymeric layers numbering at least 30, or at least 50, or at least 100, or at least 150, or at least 200, or at least 250, or at least 300, or at least 350, or at least 400, in total. In some embodiments, each of the first polymeric layers may have an average thickness of less than about 500 nm, or less than about 400 nm, or less than about 300 nm, or less than about 200 nm. In some embodiments, first optical reflector may further include at least one skin having an average thickness of greater than about 500 nm, or greater than about 750 nm, or greater than about 1000 nm.

In some embodiments, the light collimating film may face the optical sensor and may include a plurality of substantially coplanar alternating first and second regions. In some embodiments, each of the first regions may have a lateral maximum dimension W1 and a height H1, such that the ratio H1/W1 is greater than or equal to 2, or greater than or equal to 5, or greater than or equal to 10, or greater than or equal to 20, or greater than or equal to 30, or greater than or equal to 40, or greater than or equal to 50. In some embodiments, each of the second regions of the light collimating film may have a height substantially equal to H, and an absorption coefficient of each of the second regions of the light collimating film in each of the visible and infrared wavelength ranges varies by less than about 20%, or less than about 15%, or less than about 10%, or less than about 5%, across the thickness of the second region. In some embodiments, each of the second regions of the light collimating film may include an optically transparent portion sandwiched between opposing optically absorbing portions. In such embodiments, at least one of the first regions may include at least one light absorbing wall.

In some embodiments, for an incident light, a visible (i.e., human-visible) wavelength range extending from about 420 nm to about 680 nm, and an infrared wavelength range extending from about 750 to about 1500 nm and including the at least first wavelength: for each of a first incident angle of less than about 5 degrees and a second incident angle of between about 40 degrees and about 70 degrees (or between about 50 degrees and about 60 degrees, or between about 55 degrees to about 65 degrees), the plurality of polymeric layers may have an average optical reflectance of greater than about 70%, or greater than about 75%, or greater than about 80%, or greater than about 85%, or greater than about 90%, or greater than about 95% in the visible wavelength range, and an optical transmittance of greater than about 30%, or greater than about 35%, or greater than about 40%, or greater than about 45%, or greater than about 50%, for the at least first wavelength in the infrared wavelength range.

In some embodiments, for the first incident angle and each of the visible and infrared wavelength ranges, the first regions of the light collimating film may have an average optical transmittance of greater than about 50%, or greater than about 60%, or greater than about 70%, or greater than about 80%, and the second regions of the light collimating film have an average optical absorbance of greater than about 30%, or greater than about 40%, or greater than about 50%, or greater than about 60%, or greater than about 70%, or greater than about 80%. In some embodiments, for the second incident angle and each of the visible and infrared wavelength ranges, the optical stack may have an optical transmittance of less than about 10%, or less than about 8%, or less than about 6%, or less than about 4%, or less than about 2%, or less than about 1%.

In some embodiments, the display system may further include a light source configured to emit light having the first wavelength, such that the optical sensor detects the emitted light after the emitted light is reflected by the user body portion.

In some embodiments, the optical stack may further include a second optical reflector disposed between the first optical reflector and the light collimating film. In some embodiments, the second optical reflector may include a plurality of laterally spaced apart first regions defining one or more second regions therebetween, such that, for the first incident angle, the first regions of the second optical reflector may have an average optical transmittance of greater than about 50%, or greater than about 60%, or greater than about 70%, or greater than about 80%, in each of the visible and infrared wavelength ranges, and, for each of the first and second incident angles, the one or more second regions of the second optical reflector may have an average optical reflectance of greater than about 30%, or greater than about 40%, or greater than about 50%, or greater than about 60%, or greater than about 70%, or greater than about 80%, in the infrared wavelength range. In some embodiments, for each of the first and second incident angles, the one or more second regions of the second optical reflector may have an average optical reflectance of greater than about 60%, or greater than about 70%, or greater than about 80%, or greater than about 90%, in the visible wavelength range. In some embodiments, the first regions of the second optical reflector may be physical openings. In such embodiments, the physical openings may be physical through-openings extending between opposing outermost major surfaces of the second optical reflector. In other embodiments, the first regions of the second optical reflector may be optical openings. In such embodiments, the optical openings may be optical through-openings extending between opposing outermost major surfaces of the second optical reflector. In some embodiments, a first optical bonding layer may bond the first optical reflector and the second optical reflector to each other, and a second optical bonding layer may bond the second optical reflector to the light collimating film. In some embodiments, the second optical reflector may include a plurality of second polymeric layers numbering at least 30, or at least 50, or at least 100, or at least 150, or at least 200, or at least 250, or at least 300, or at least 350, or at least 400, in total. In such embodiments, each of the second polymeric layers may have an average thickness of less than about 500 nm, or about 400 nm, or about 300 nm, or about 200 nm.

According to some aspects of the present description, an optical stack for use in a display system for imaging a user body portion (e.g., a finger or a vein pattern) placed at or proximate to the display system includes a light collimating film disposed between first and second optical reflectors. In some embodiments, each of the second optical reflector and the light collimating film may include a plurality of laterally spaced apart first regions defining one or more second regions therebetween. For an incident light, and for each of at least one visible wavelength in a visible wavelength range extending from about 420 nm to about 680 nm, and at least one infrared wavelength in an infrared wavelength range extending from about 750 to about 1500 nm, and for a first incident angle of less than about 5 degrees: the first optical reflector may have an optical reflectance of greater than about 70%, or greater than about 75%, or greater than about 80%, or greater than about 85%, or greater than about 90%, or greater than about 95%, for the at least one visible wavelength, and an optical transmittance of greater than about 30%, or greater than about 35%, or greater than about 40%, or greater than about 45%, or greater than about 50%, for the at least one infrared wavelength. In some embodiments, for a second incident angle of between about degrees and about 70 degrees, or between about 50 degrees and about 60 degrees, or between about 55 degrees to about 65 degrees, the optical stack may have an optical transmittance of less than about 10%, or less than about 8%, or less than about 6%, or less than about 4%, or less than about 2%, or less than about 1%, for each of the at least one visible wavelength and the at least one infrared wavelength.

In some embodiments, each of the first regions of the second optical reflector and the light collimating film may have an optical transmittance of greater than about 50%, or greater than about 60%, or greater than about 70%, or greater than about 80%. In some embodiments, each of the one or more second regions of the second optical reflector may have an optical reflectance of greater than about 30%, or greater than about 40%, or greater than about 50%, or greater than about 60%, or greater than about 70%, or greater than about 80%, and each of the one or more second regions of the light collimating film may have an average optical absorbance of greater than about 30%, or greater than about 40%, or greater than about 50%, or greater than about 60%, or greater than about 70%, or greater than about 80%.

Figure 1B:
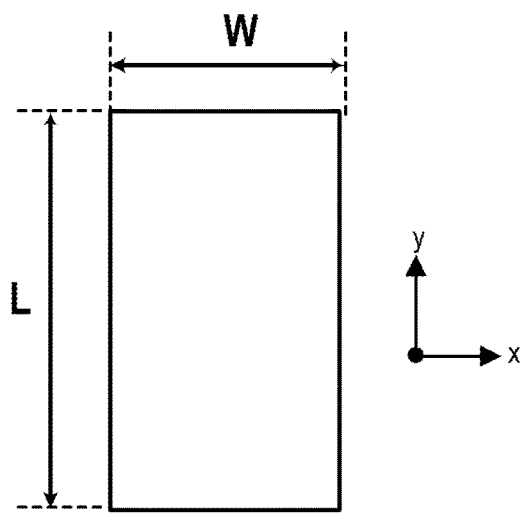

Turning now to the figures, FIGS. 1A and 1B provide side views of a display system for imaging a user body portion placed at or proximate to the display system, according to the present description. FIG. 1A shows a display system 300 which includes display panel 20 configured to generate an image 21, an optical sensor 30, and an optical stack 200 disposed between the display panel 20 and optical sensor 30. In some embodiments, the optically active regions of the optical sensor 30 and the display panel 20 are substantially co-extensive with each other in length (i.e., L, x-axis) and width (i.e., W, y-axis) as shown in FIG. 1B. In some embodiments, display system 300 further includes a light source 90 configured to emit light 91, 92, which may be detected by optical sensor 30 after being reflected by user body portion 10 (e.g., a finger of a user).

In some embodiments, optical stack 200 may include a first optical reflector 40, a light collimating film 50, and a second optical reflector 70 disposed between first optical reflector 40 and light collimating film 50. In some embodiments, a first optical bonding layer 80 bonds the first optical reflector 40 and second optical reflector 70 to each other. In some embodiments, a second optical bonding layer 81 bonds second optical reflector 70 to light collimating film 50. In some embodiments, first optical reflector 40 faces display panel 20 and includes a plurality of first polymeric layers numbering at least 30 in total, each of the first polymeric layers having an average thickness of less than about 500 nm (see FIG. 3 for additional details). In some embodiments, light collimating film 50 faces optical sensor 30 and includes a plurality of substantially coplanar (i.e. coplanar in the xy-plane, as shown in FIG. 1A) alternating first regions 51 and second regions 52. In some embodiments, each of the first regions 51 may have a lateral maximum dimension W1 and a height H1, such that the ratio H1/W1 is greater than or equal to about 2, or greater than or equal to about 5, or greater than or equal to about 10, or greater than or equal to about 20, or greater than or equal to about 30, or greater than or equal to about 40, or greater than or equal to about 50.

In some embodiments, when optical stack 200 includes second optical reflector 70, second optical reflector 70 includes a plurality of laterally spaced first regions 71 defining one or more second regions 72 therebetween. In some embodiments, first regions 71 of second optical reflector 70 may be physical openings. In such embodiments, the physical openings are physical through-openings extending between opposing outermost major surfaces of second optical reflector 70 (see FIG. 4 for additional details). In some embodiments, first regions 71 of second optical reflector 70 may be optical openings. In such embodiments, the optical openings are optical through-openings extending between opposing outermost major surfaces of second optical reflector 70 (see FIG. 4 for additional details).

Figure 2:
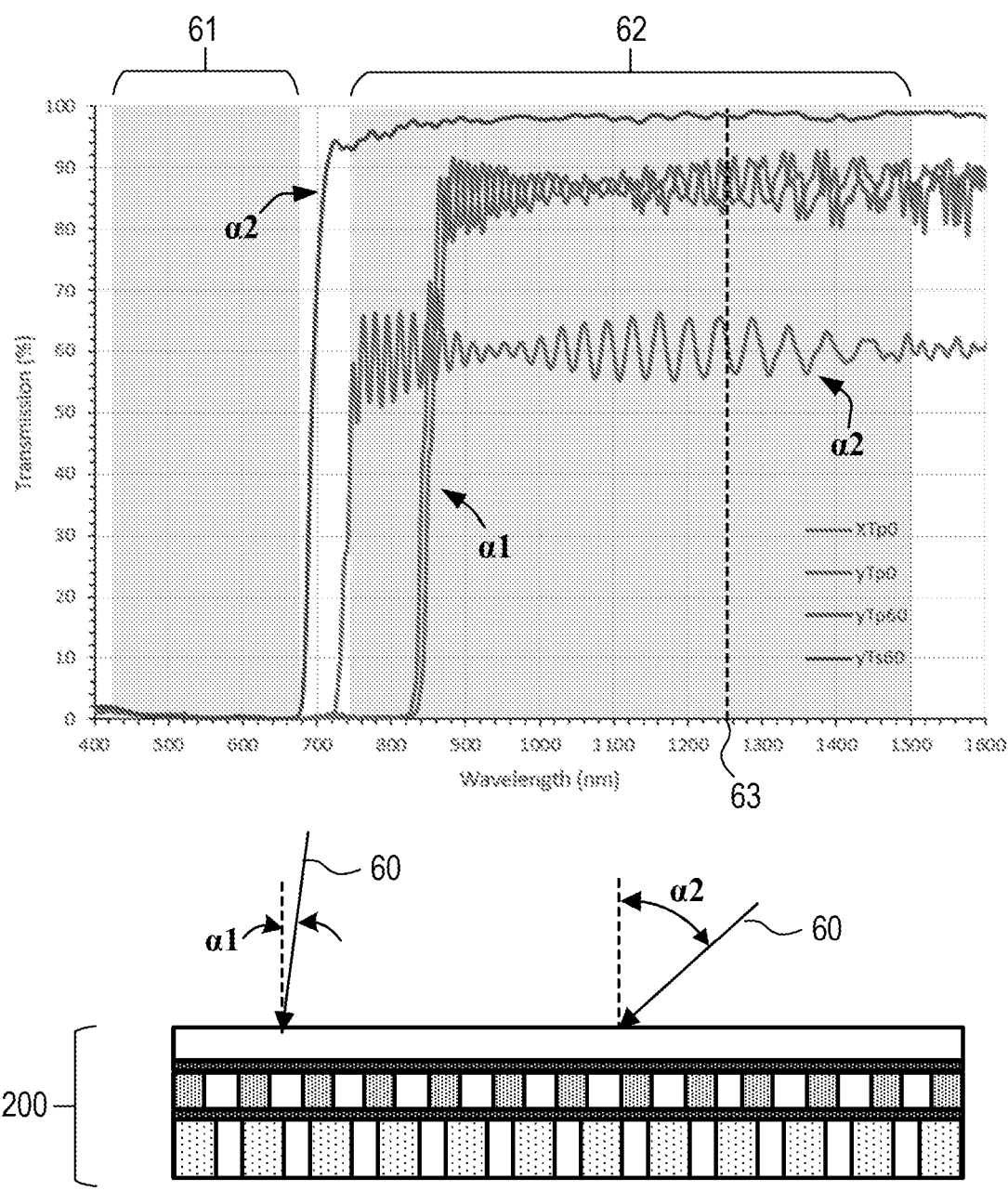
FIG. 2 is a plot of percent transmission versus wavelength for a number of different incident angles for an optical reflector and optical stack, in accordance with an embodiment of the present description.

FIG. 2 is a plot of percent transmission versus wavelength for a number of different incident angles for the optical stack 200 of FIG. 1A. References to FIG. 1A may be made in the following discussion of FIG. 2, and FIGS. 1A and 2 should be referenced together for this discussion. In some embodiments, optical sensor 30 may be configured to detect light having at least a first wavelength 63 (e.g., an infrared wavelength), and optical stack 200 may be configured such that, for an incident light 60, a visible wavelength range 61 extending from about 420 nm to about 680 nm, and an infrared wavelength range 62 extending from about 750 to about 1500 nm and including first wavelength 63:

for each of a first incident angle $\alpha 1$ of less than about 5 degrees and a second incident angle $\alpha 2$ of between about 40 degrees and about 70 degrees, or between about 50 degrees and about 60 degrees, or between about 55 degrees to about 65 degrees, the plurality of first polymeric layers of first optical reflector 40 may have an average optical reflectance of greater than about 70%, or greater than about 75%, or greater than about 80%, or greater than about 85%, or greater than about 90%, or greater than about 95%, in visible wavelength range 61 and an optical transmittance of greater than about 30% (or 35%, or 40%, or 45%, or 50%) for at least first wavelength 63 in the infrared wavelength range 62;

for the first incident angle $\alpha 1$ and each of the visible 61 and infrared 62 wavelength ranges, the first regions 51 of the light collimating film 50 may have an average optical transmittance of greater than about 50%, or greater than about 60%, or greater than about 70%, or greater than about 80%, and the second regions of the light collimating film 50 have an average optical absorbance of greater than about 30%, or greater than about 40%, or greater than about 50%, or greater than about 60%, or greater than about 70%, or greater than about 80%; and for the second incident angle $\alpha 2$ and each of the visible 61 and infrared 62 wavelength ranges, the optical stack 200 may have an optical transmittance of less than about 10%, or less than about 8%, or less than about 6%, or less than about 4%, or less than 2%, or less than about 1%.

In some embodiments, when optical stack 200 also includes second optical reflector 70 disposed between first optical reflector 40 and the light collimating film 50:

for first incident angle $\alpha 1$, first regions 71 of second optical reflector 70 may have an average optical transmittance of greater than about 50%, or greater than about 60%, or greater than about 70%, or greater than about 80%, in each of the visible 61 and infrared 62 wavelength ranges; and for each of the first $\alpha 1$ and second $\alpha 2$ incident angles, second regions 72 of second optical reflector 70 may have an average optical reflectance of greater than about 30%, or greater than about 40%, or greater than about 50%, or greater than about 60%, or greater than about 70%, or greater than about 80% in the infrared wavelength range 62. In some embodiments, for each of the first $\alpha 1$ and second $\alpha 2$ incident angles, the one or more second regions have an average optical reflectance of greater than about 60%, or greater than about 70%, or greater than about 80%, or greater than about 90%, in the visible wavelength range 61.

Figure 3:
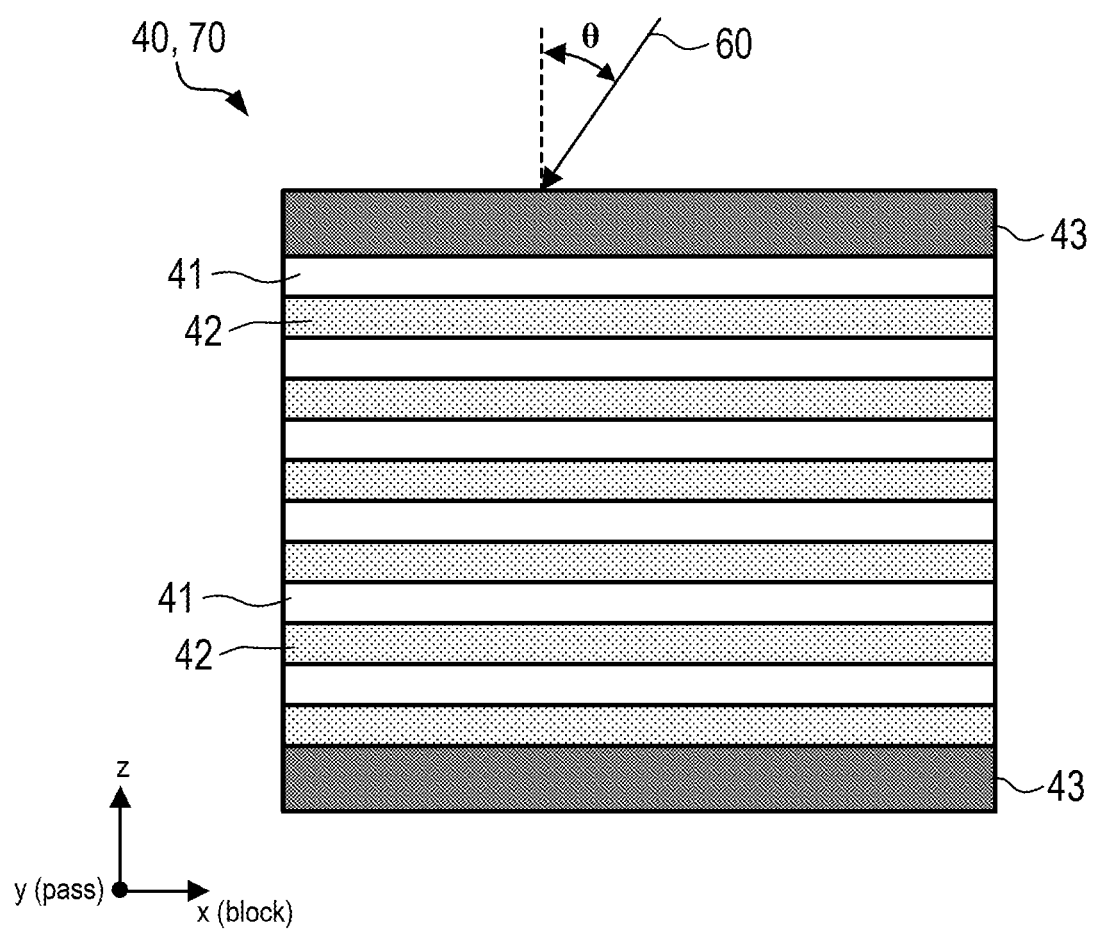
FIG. 3 is a depiction of alternating polymeric layers in a first optical reflector in an optical stack, in accordance with an embodiment of the present description.

FIG. 3 is a depiction of alternating polymeric layers in a multilayer optical film, such as first optical reflector 40 and second optical reflector 70 of optical stack 200, as shown in FIG. 1A. Each of first optical reflector 40 and second optical reflector 70 may, in some embodiments, include a plurality of alternating first polymeric layers 41, 42 numbering at least 30, or at least 50, or at least 100, or at least 150, or at least 200, or at least 250, or at least 300, or at least 350, or at least 400 in total. In some embodiments, each of the first polymeric layers 41, 42 may have an average thickness of less than about 500 nm, or about 400 nm, or about 300 nm, or about 200 nm. In some embodiments, one or both of first optical reflector 40 and second optical reflector 70 may include at least one outer skin 43 which may have an average thickness of greater than about 500 nm, or about 750 nm, or about 1000 nm. Incident light 60 (see also FIG. 2) is shown impinging on the multilayer optical film at an angle θ, which (as shown in FIG. 2) could be first incident angle α1 or second incident angle α2.

Figure 4:
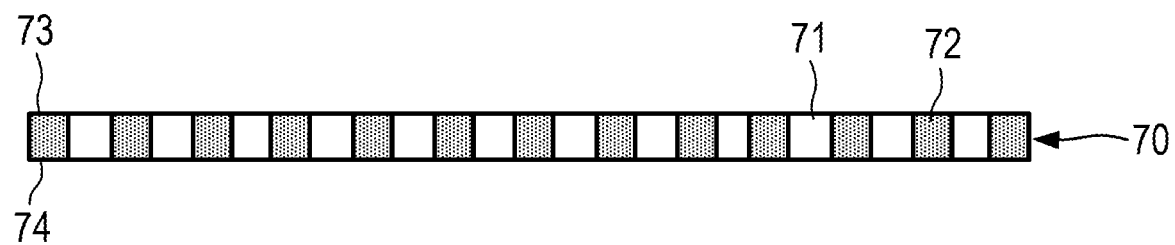
FIG. 4 is a side view of a second optical reflector in an optical stack, in accordance with an embodiment of the present description.

FIG. 4 is a side view of second optical reflector 70 of FIG. 1A, providing additional details. In some embodiments, second optical reflector 70 includes a plurality of laterally spaced apart first regions 71 defining one or more second regions 72 therebetween. In some embodiments, first regions 71 in second reflector 70 may be physical through-openings or optical through-opening extending between first major surface 73 and second major surface 74 of second optical reflector 70.

Figure 5A:
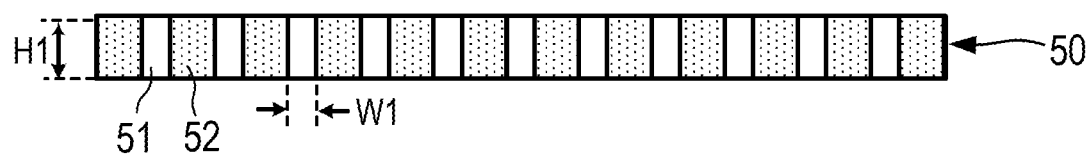
FIGS. 5A and 5B provide views of a light collimating film, in accordance with an embodiment of the present description.
Figure 5B:
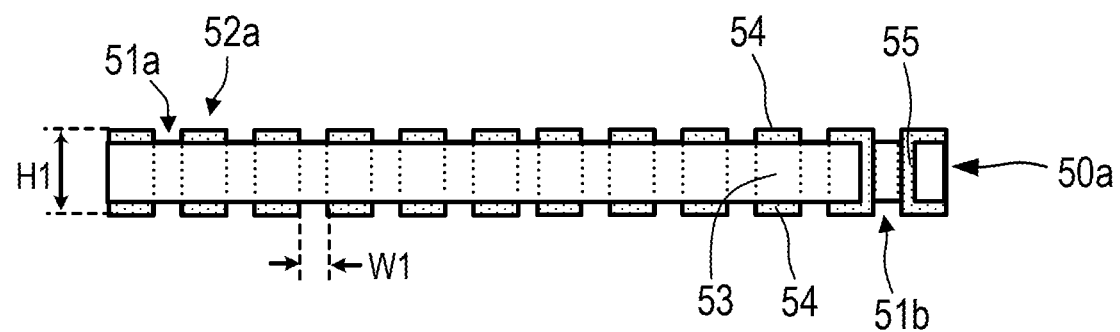

Finally, FIGS. 5A and 5B provide views of light collimating film 50 of FIG. 1A. FIG. 5A repeats the embodiment of light collimating film 50 shown in FIG. 1A. In some embodiments, light collimating film 50 includes a plurality of substantially coplanar alternating first regions 51 and second regions 52. In some embodiments, each of the first regions 51 may have a lateral maximum dimension W1 and a height H1, such that the ratio H1/W1 is greater than or equal to about 2, or greater than or equal to about 5, or greater than or equal to about 10, or greater than or equal to about 20, or greater than or equal to about 30, or greater than or equal to about 40, or greater than or equal to about 50. In some embodiments, each of second regions 52 of light collimating film 50 may have a height substantially equal to H1, and an absorption coefficient of each of second regions 52 of light collimating film 50 in each of the visible 61 and infrared 62 wavelength ranges (see FIG. 2) may vary by less than about 20%, or less than about 15%, or less than about 10%, or less than about 5%, across the thickness of the second region.

Turning to the embodiments of FIG. 5B, light collimating film 50a includes a plurality of substantially coplanar alternating first regions 51a and second regions 52a. In some embodiments, each of the second regions 52a of light collimating film 50a may include an optically transparent portion 53 sandwiched between opposing optically absorbing portions 54. In some embodiments, at least one of first regions 51b comprises at least one light absorbing wall 55.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A display system for imaging a user body portion placed proximate to the display system, the display system comprising:
   a display panel configured to generate an image for viewing by the user;
   an optical sensor disposed on the display panel opposite the user body portion and configured to detect light having at least a first wavelength and reflected by the user body portion, optically active regions of the optical sensor and the display panel substantially co-extensive with each other in length and width; and
   an optical stack disposed between the display panel and the optical sensor and comprising:
   a first optical reflector facing the display panel and comprising a plurality of first polymeric layers numbering at least 30 in total, each of the first polymeric layers having an average thickness of less than about 500 nm; and
   a light collimating film facing the optical sensor and comprising a plurality of substantially coplanar alternating first and second regions, each of the first regions having a lateral maximum dimension W1 and a height H1, H1/W1≥2, such that for an incident light, a visible wavelength range extending from about 420 nm to about 680 nm, and an infrared wavelength range extending from about 750 to about 1500 nm and comprising the at least the first wavelength:
   for each of a first incident angle of less than about 5 degrees and a second incident angle of between about 40 degrees and about 70 degrees, the plurality of polymeric layers has an average optical reflectance of greater than about 70% in the visible wavelength range and an optical transmittance of greater than about 30% for the at least the first wavelength in the infrared wavelength range;
   for the first incident angle and each of the visible and infrared wavelength ranges, the first regions of the light collimating film have an average optical transmittance of greater than about 50%, and the second regions of the light collimating film have an average optical absorbance of greater than about 30%; and
   for the second incident angle and each of the visible and infrared wavelength ranges, the optical stack has an optical transmittance of less than about 10%.

2. The display system of claim 1, wherein the user body portion comprises one or more of a finger of the user, a palm of the user, a vein of the user, a face of the user, and a vein pattern of the user.

3. The display system of claim 1, wherein the optical stack further comprises a second optical reflector disposed between the first optical reflector and the light collimating film and comprising a plurality of laterally spaced apart first regions defining one or more second regions therebetween, such that:
   for the first incident angle, the first regions of the second optical reflector have an average optical transmittance of greater than about 50% in each of the visible and infrared wavelength ranges; and
   for each of the first and second incident angles, the one or more second regions have an average optical reflectance of greater than about 30% in the infrared wavelength range.

4. The display system of claim 3, wherein for each of the first and second incident angles, the one or more second regions of the second optical reflector have an average optical reflectance of greater than about 60% in the visible wavelength range.

5. The display system of claim 3, wherein the first regions of the second optical reflector are physical openings.

6. The display system of claim 5, wherein the physical openings are physical through openings extending between opposing outermost major surfaces of the second optical reflector.

7. The display system of claim 3, wherein the first regions of the second optical reflector are optical openings.

8. The display system of claim 7, wherein the optical openings are optical through openings extending between opposing outermost major surfaces of the second optical reflector.

9. The display system of claim 3, wherein a first optical bonding layer bonds the first and second optical reflectors to each other, and a second optical bonding layer bonds the second optical reflector to the light collimating film.

10. The display system of claim 3, wherein second optical reflector comprises a plurality of second polymeric layers numbering at least 30 in total, each of the second polymeric layers having an average thickness of less than about 500 nm.

11. The display system of claim 1, wherein each of the second regions of the light collimating film has a height substantially equal to H, and wherein an absorption coefficient of each of the second regions in each of the visible and infrared wavelength ranges varies by less than about 20% across the thickness of the second region.

12. The display system of claim 1, wherein each of the second regions of the light collimating film comprises an optically transparent portion sandwiched between opposing optically absorbing portions.

13. The display system of claim 12, wherein at least one of the first regions of the light collimating film comprises at least one light absorbing wall.

14. The display system of claim 1 further comprising a light source configured to emit light having the first wavelength, the optical sensor detecting the emitted light after the emitted light is reflected by the user body portion.

15. The display system of claim 1, wherein first optical reflector further comprises at least one skin having an average thickness of greater than about 500 nm.

16. An optical stack for use in a display system for imaging a user body portion placed proximate to the display system, the optical stack comprising a light collimating film disposed between first and second optical reflectors, each of the second optical reflector and the light collimating film comprising a plurality of laterally spaced apart first regions defining one or more second regions therebetween,
   such that for an incident light, for each of at least one visible wavelength in a visible wavelength range extending from about 420 nm to about 680 nm and at least one infrared wavelength in an infrared wavelength range extending from about 750 to about 1500 nm, and for a first incident angle of less than about 5 degrees:
   the first optical reflector has an optical reflectance of greater than about 70% for the at least one visible wavelength and an optical transmittance of greater than about 30% for the at least one infrared wavelength; and
   each of the first regions of the second optical reflector and the light collimating film has an optical transmittance of greater than about 50%, each of the one or more second regions of the second optical reflector has an optical reflectance of greater than about 30%, and each of the one or more second regions of the light collimating film has an average optical absorbance of greater than about 30%.

17. The optical stack of claim 16, wherein for a second incident angle of between about 40 degrees and about 70 degrees, the optical stack has an optical transmittance of less than about 10% for each of the at least one visible wavelength and the at least one infrared wavelength.

* * * * *